(12) United States Patent
Guruswamappa et al.

(10) Patent No.: US 10,885,451 B2
(45) Date of Patent: Jan. 5, 2021

(54) METHODS AND SYSTEMS FOR IDENTIFYING AND PROJECTING RECURRENT EVENT PATTERNS IN INFORMATION TECHNOLOGY INFRASTRUCTURE

(71) Applicant: Wipro Limited, Bangalore (IN)

(72) Inventors: Shivamurthy Harave Guruswamappa, Chamarajanagar (IN); Ramkumar Balasubramanian, Bangalore (IN); Premchand Ryali, Bangalore (IN)

(73) Assignee: Wipro Limited, Bangalore (IN)

(*) Notice: Subject to any disclaimer, the term of this patent is extended or adjusted under 35 U.S.C. 154(b) by 1012 days.

(21) Appl. No.: 15/420,121

(22) Filed: Jan. 31, 2017

(65) Prior Publication Data
US 2018/0157983 A1 Jun. 7, 2018

(30) Foreign Application Priority Data
Dec. 7, 2016 (IN) .............................. 201641041891

(51) Int. Cl.
*G06N 5/04* (2006.01)
*G06F 11/07* (2006.01)
(Continued)

(52) U.S. Cl.
CPC ......... *G06N 5/047* (2013.01); *G06F 11/0751* (2013.01); *G06F 11/3466* (2013.01);
(Continued)

(58) Field of Classification Search
CPC ........ G06N 20/00; G06N 20/10; G06N 20/20; G06N 5/047; G06N 7/005; G06N 7/00;
(Continued)

(56) References Cited

U.S. PATENT DOCUMENTS

| 9,317,829 B2 | 4/2016 | Anand et al. |
| 2004/0093331 A1 | 5/2004 | Garner et al. |

(Continued)

FOREIGN PATENT DOCUMENTS

| WO | WO 2007/141766 | 12/2007 |
| WO | WO 2015/053774 | 4/2015 |

OTHER PUBLICATIONS

Extended European Search Report issued in the European Patent Office in counterpart European Application No. 17161226.0, dated Sep. 20, 2017, 10 pages.

*Primary Examiner* — Shane D Woolwine
(74) *Attorney, Agent, or Firm* — Finnegan, Henderson, Farabow, Garrett & Dunner, LLP

(57) ABSTRACT

A method for identifying and projecting recurrent event patterns in an Information Technology (IT) infrastructure is disclosed. The method includes deriving at least one time period based on historical events data; grouping the historical events data comprising a plurality of events based on the at least one time period to create a plurality of data points sets; creating an event corpus comprising each of the plurality of events arranged based on frequency of occurrence across the plurality of data points sets; identifying one or more events that have highest frequency of occurrence within the event corpus; determining one or more data points sets from the plurality of data points sets in which the one or more events have occurred; and computing a projected frequency of occurrence of the one or more events in future time periods.

19 Claims, 6 Drawing Sheets

(51) Int. Cl.
 *G06F 11/34* (2006.01)
 *G06F 11/30* (2006.01)

(52) U.S. Cl.
 CPC .......... *G06F 11/07* (2013.01); *G06F 11/3006* (2013.01); *G06F 11/3433* (2013.01); *G06F 11/3452* (2013.01)

(58) Field of Classification Search
 CPC ............. G06F 11/3006; G06F 11/3051; G06F 11/3433; G06F 11/3452; G06F 11/3466; G06F 11/0727; G06F 11/0751; G06F 11/07
 USPC .......................................................... 706/48
 See application file for complete search history.

(56) References Cited

U.S. PATENT DOCUMENTS

| | | |
|---|---|---|
| 2005/0080806 A1 | 4/2005 | Doganata et al. |
| 2007/0219992 A1 | 9/2007 | Bollinger et al. |
| 2014/0310235 A1* | 10/2014 | Chan .................. G06F 11/3003 707/603 |
| 2017/0046127 A1* | 2/2017 | Fletcher ................ H04L 41/069 |

* cited by examiner

METHODS AND SYSTEMS FOR IDENTIFYING AND PROJECTING RECURRENT EVENT PATTERNS IN INFORMATION TECHNOLOGY INFRASTRUCTURE

TECHNICAL FIELD

This disclosure relates generally to identifying events in Information Technology (IT) infrastructure and more particularly to methods and systems for identifying and projecting recurrent event patterns in IT infrastructure.

BACKGROUND

Businesses in many industries, for example, Information Technology (IT) and banking services, healthcare, financial services, insurance, pharmaceuticals, media, and telecom heavily rely on IT. In order to cater to the enormous and varying demands these industries, large and complex IT infrastructures are used. This is to ensure that their businesses are well supported and run smoothly and efficiently. Successful running of these businesses is dependent on the availability and error free functioning of the IT infrastructure. As a result, any issue or event in the IT infrastructure has a direct and adverse effect on these Businesses.

Thus it is crucial to not only resolve an issue or event in real-time but also predict occurrence of any such event so that its adverse impact on the business could be mitigated beforehand.

SUMMARY

In one embodiment, a method for identifying and projecting recurrent event patterns in an Information Technology (IT) infrastructure is disclosed. The method includes deriving, by a network device, at least one time period based on historical events data of the IT infrastructure, wherein the at least one time period is derived based on discontinuity periods in the historical events data; grouping, by the network device, the historical events data comprising a plurality of events captured for the IT infrastructure, based on the at least one time period to create a plurality of data points sets, wherein each data points set is associated with one of the at least one time period and comprises at least one event from the plurality of events; creating, by the network device, an event corpus comprising each of the plurality of events arranged based on frequency of occurrence across the plurality of data points sets; identifying, by the network device, one or more events that have highest frequency of occurrence within the event corpus; determining, by the network device, one or more data points sets from the plurality of data points sets in which the one or more events have occurred; and computing, by the network device, a projected frequency of occurrence of the one or more events in future time periods corresponding to the one or more data points sets based on frequency of occurrence of the one or more events in the one or more data points sets.

In another embodiment, a network device for identifying and projecting recurrent event patterns in an IT infrastructure is disclosed. The network device includes at least one processor; and a memory communicatively coupled to the at least one processor, wherein the memory stores processor instructions, which, on execution, causes the processor to derive at least one time period based on historical events data of the IT infrastructure, wherein the at least one time period is derived based on discontinuity periods in the historical events data; group the historical events data comprising a plurality of events captured for the IT infrastructure, based on the at least one time period to create a plurality of data points sets, wherein each data points set is associated with one of the at least one time period and comprises at least one event from the plurality of events; create an event corpus comprising each of the plurality of events arranged based on frequency of occurrence across the plurality of data points sets; identify one or more events that have highest frequency of occurrence within the event corpus; determine one or more data points sets from the plurality of data points sets in which the one or more events have occurred; and compute a projected frequency of occurrence of the one or more events in future time periods corresponding to the one or more data points sets based on frequency of occurrence of the one or more events in the one or more data points sets.

In yet another embodiment, a non-transitory computer-readable storage medium is disclosed. The non-transitory computer-readable storage medium having stored thereon, a set of computer-executable instructions for identifying and projecting recurrent event patterns in an IT infrastructure causing a computer comprising one or more processors to perform steps comprising deriving, by a network device, at least one time period based on historical events data of the IT infrastructure, wherein the at least one time periods are derived based on discontinuity periods in the historical events data; grouping, by the network device, the historical events data comprising a plurality of events captured for the IT infrastructure, based on the at least one time period to create a plurality of data points sets, wherein each data points set is associated with one of the at least one time period and comprises at least one event from the plurality of events; creating, by the network device, an event corpus comprising each of the plurality of events arranged based on frequency of occurrence across the plurality of data points sets; identifying, by the network device, one or more events that have highest frequency of occurrence within the event corpus; determining, by the network device, one or more data points sets from the plurality of data points sets in which the one or more events have occurred; and computing, by the network device, a projected frequency of occurrence of the one or more events in future time periods corresponding to the one or more data points sets based on frequency of occurrence of the one or more events in the one or more data points sets.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
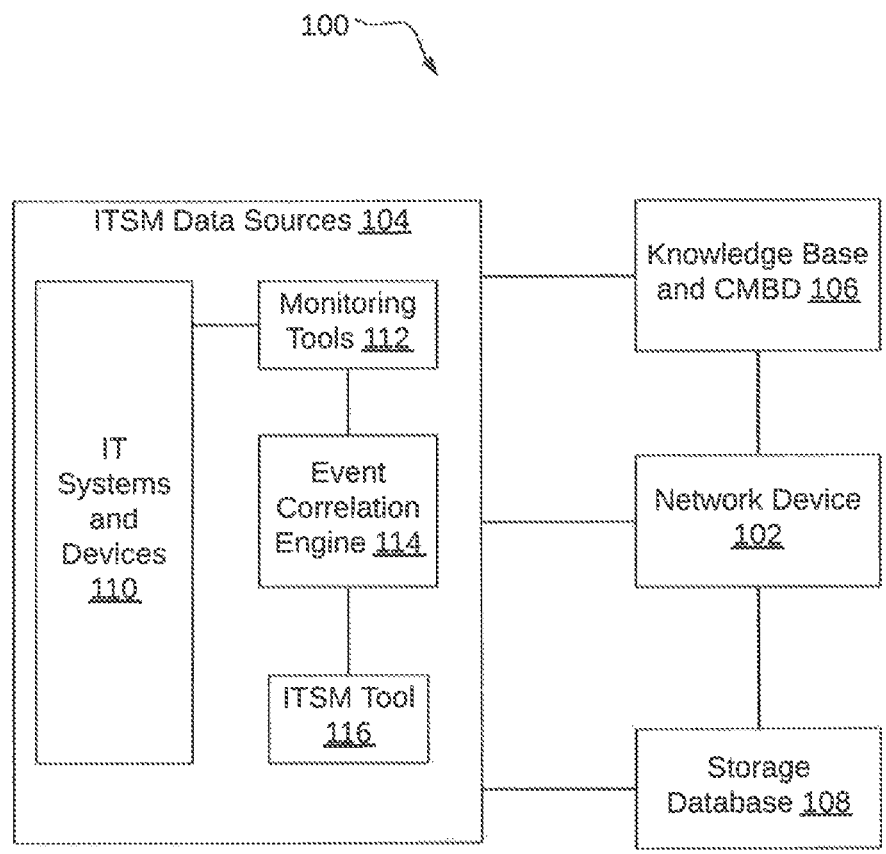
FIG. 1 is a block diagram illustrating a system for identifying and projecting recurrent event patterns in an Information Technology (IT) infrastructure, in accordance with an embodiment.

Additional illustrative embodiments are listed below. In one embodiment, a block diagram of a system 100 for identifying and projecting recurrent event patterns in an Information Technology (IT) infrastructure is illustrated in FIG. 1. System 100 includes a network device 102 which is communicatively coupled, through a wireless and/or a wired network, to IT Service Management (ITSM) data sources 104, a knowledge base and Configuration Management Database (CBMD) 106, and a storage database 108.

Network device 102 identifies recurrent event pattern using historical events data of the IT infrastructure, based on which, network device 102 projects frequency of occurrence of events in future time periods. Network device 102 and its functionality has been explained in detail in conjunction with FIG. 2 and FIG. 3. Examples of network device, may include, but are not limited to a router, a Gateway, an application server.

To determine the recurrent event pattern, network device 102 retrieves the historical events data from ITSM data sources 104 that include IT systems and devices 110, monitoring tools 112, an event correlation engine 114, and an ITSM tool 116. IT systems and devices 110 are a collection of hardware and software network that support the IT infrastructure and thus the business utilizing it. IT systems and devices 110 are responsible for information processing, which may include archival and retrieval of information. Examples of hardware may include but are not limited to a server, a switch, and an adopter and examples of software may include, but are not limited to an operating system or applications.

The behavior and functionality of IT systems and devices 110 are monitored by monitoring tools 112 at regular intervals by comparing with predefined thresholds. Monitoring tools 112 thus identify problems or issues in IT systems and devices 110. These problems or issues are the events occurring in IT system and devices 110 that are captured by monitoring tools 112. Examples of monitoring tools 112 may include, but are not limited to Wipro Viking, HP open view, and IBM Tivoli.

The events identified by monitoring tools 112 are provided to event correlation engine 114, which then analyzes relationship between these events to identify important events that need to focused on. Moreover, based on the analysis, event correlation engine 114 uses a predefined set of rules in order to suppress the unwanted events before they are logged as tickets by ITSM tool 116, which processes these tickets for fast and accurate resolution. Examples of ITSM tool 116 may include, but are not limited to Helpline and Remedy. ITSM data sources 104 may store all information generated by its various components in storage database 108. Examples of storage databases 108 may include, but are not limited to SQL and DB2.

The ticket information along with alerts and the associated contextual, semantic, and seasonality knowledge are stored in knowledge base and CBMD 106. It also includes information about converged infrastructure of a particular location and associated capacities. Knowledge base and CBMD 106 has been explained in detail as Semantic and Contextual Knowledge (SCK) database 104 in the Indian Patent Application No: 5361/CHE/2015, filed on "Jul. 10, 2015," titled, "System and Method For Optimizing Event Alerts In An Information Technology (IT) Infrastructure Management System," which is incorporated herein by reference in its entirety. Other components in system 100, i.e., event correlation engine 114, monitoring tools 112, and their respective functionalities have also been explained in detail in the above mentioned patent application. Network device 102 communicates with each of these components in system 100 in order to identify and project recurrent event patterns in the IT infrastructure. This is explained in detail in conjunction with FIG. 2.

Figure 2:
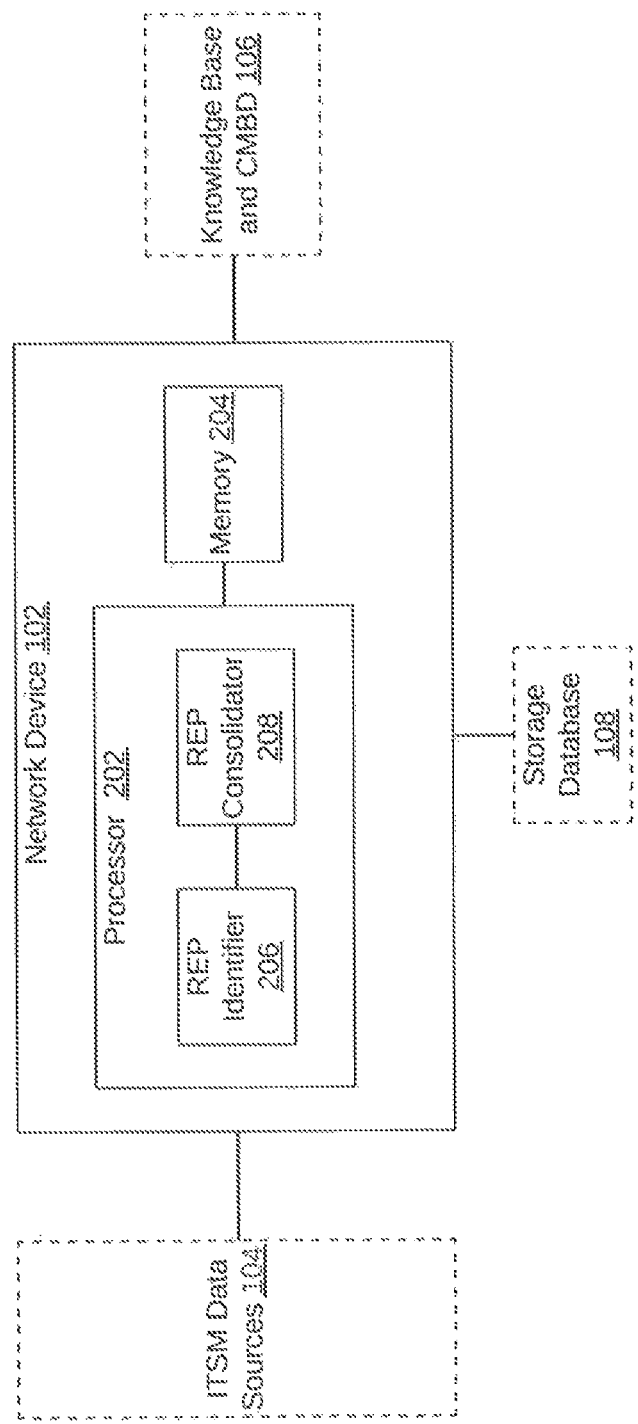
FIG. 2 is a block diagram illustrating a network device for identifying and projecting recurrent event patterns in an Information Technology (IT) infrastructure, in accordance with an embodiment.

Referring now to FIG. 2, a block diagram illustrating network device 102 for identifying and projecting recurrent event patterns in an IT infrastructure, in accordance with an embodiment. Network device 102 includes a processor 202 and a memory 204. Processor 202 may be implemented as one or more microprocessors, microcomputers, microcontrollers, digital signal processors, central processing units, state machines, logic circuitries, and/or any devices that manipulate signals based on operational instructions. Among other capabilities, processor 202 is configured to fetch and execute computer-readable instructions stored in memory 204. Memory 204 may be a non-transitory computer-readable medium, that may be one or more of, but is not limited to volatile memory (for example, Random Access Memory (RAM)) and nonvolatile memory (for example, Erasable Programmable Read-Only Memory (EPROM) and flash memory).

Processor 202 further includes a Recurrent Event Pattern (REP) identifier 206 and a REP consolidator 208. REP identifier 206 identifies recurrent event pattern automatically using a time series data of events and system logs provided by ITSM data sources 104. These events and system logs are the historical events data. REP identifier 206 uses discontinuity periods in the historical events data to derives one or more time periods. The one or more time periods are then used by REP identifier 206 for grouping the historical events data to create a plurality of data points sets. Each data points set is associated with one of the time periods and includes one or more events. REP identifier 206 then mines unique event pattern from the plurality of data points sets to create an event corpus and identifies one or more events within that event corpus that have highest frequency of occurrence. As a result, REP identifier 206 determines a recurrent event pattern. This is further explained in detail in conjunction with FIG. 3.

Once the recurrent event pattern has been identified, REP consolidator 208 identifies frequent event interval/seasonal periods and quantifies the number of events in order to project future occurrence of events. To this end, REP consolidator 208 identifies those events that have same frequency of occurrence in the event corpus and also determines one or more data points sets that are common for these events. This results in common instances for these events, which are called frequent event interval periods. Based on frequency of occurrence of these events in frequent event interval periods, REP consolidator 208 computes a projected frequency of occurrence of the one or more events in future time periods associated with the frequent event interval periods. This is further explained in detail in conjunction with FIGS. 3 and 5.

Figure 3:
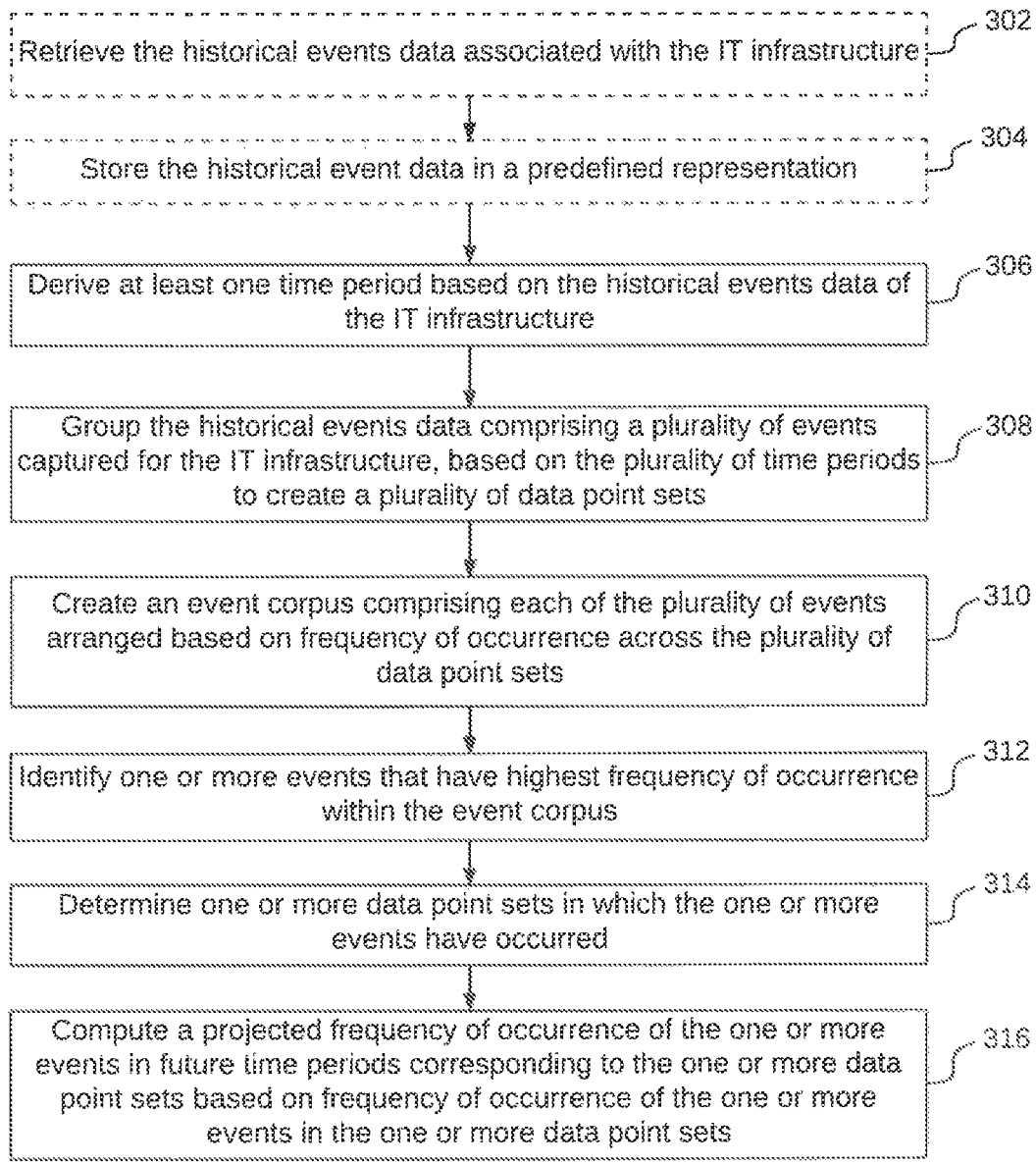
FIG. 3 illustrates a flowchart of a method for identifying and projecting recurrent event patterns in an Information Technology (IT) infrastructure, in accordance with an embodiment.

Referring now to FIG. 3, a flowchart of a method for identifying and projecting recurrent event patterns in an Information Technology (IT) infrastructure is illustrated, in accordance with an embodiment. Projecting or predicting recurrent event patterns enables an administrator to take adequate IT infrastructure corrective measures to manage these events and mitigate future issues in the IT infrastructure. These events may include, but are not limited to events related to capacity of IT infrastructures (for example, memory utilization and CPU utilization), events related to software/applications in the IT infrastructures (for example, auto system scheduler issue, database refresh failed and long running query issue), and hardware fault events (for example, port issue and LAN issue).

To this end, the historical events data associated with the IT infrastructure is first retrieved by network device 102, from one or more of ITSM data sources 104, storage database 108, and knowledge base and CMBD 106, at 302. Once the historical events data has been retrieved, network device 102 stores the historical events data in a predefined representation, at 304. In the predefined representation, each event has a Unique ID (UID), and the number of times each event has occurred is also stored along with date and time of occurrence of that event. In an exemplary embodiment, the predefined representation of events in the historical events data may be represented using table 1 given below. It will be apparent to a person skilled in the art that the number of events given in table 1 is limited to four for illustration purpose.

TABLE 1

| UID of an event | Frequency of occurrence the event | Date and time of occurrence of the event |
|---|---|---|
| 2-14-6-21-4-8-19-9-2 | 1 | 12/12/2015, 12:13:23 |
| 1-15-1-24-772-9-22-1-5 | 1 | 15/12/2015, 01:05:53 |
| 1-112-1-1334-1133-10-5531-1-5 | 1 | 17/01/2016, 07:09:33 |
| 1-8-6-87-4-22-220-20-2 | 1 | 18/02/2016, 21:11:47 |

In Table 1, unique ID of each event has a predefined pattern, such that, each unique number separated by a hyphen, for example, represents one of a hostname, an origin, an assignee group, an event type, or a severity against a time period associated with an event. It will be apparent to a person skilled in the art that in the predefined pattern, the unique numbers may be replaced by unique characters. This has been explained in detail in conjunction with the Indian Patent Application No: 4067/CHE/2015, filed on: "Aug. 5, 2015," titled: "System and Method For Predicting An Event In An Information Technology (IT) Infrastructure," which is incorporated herein by reference in its entirety.

Thereafter, at 306, network device 102 derives one or more time periods based on the historical events data of the IT infrastructure. The one or more time periods are derived based on discontinuity periods in the historical events data. To this end, events in the historical events data are first segregated based on time of occurrence across a plurality of one-hour intervals. In an embodiment, this one hourly segregation of the historical events data may be performed over a span of 24 hours for each day. This segregation is performed over the total number of days the historical events data was captured for. For example, if the historical events data was captured for a span of seven days, hourly segregation of the historical events data is performed for each of these seven days.

The per hour segregation of the historical events data is represented in the form of a time period matrix. In the time period matrix, every one-hour interval that does not have any event occurrence, is padded with a zero. In an exemplary embodiment, the timer period matrix for one day's historical events data may be represented by table 2 given below:

TABLE 2

| Hour | Total Frequency of Events | Zero Padding |
|---|---|---|
| 1AM | | 0 |
| 2AM | | 0 |
| 3AM | | 0 |
| 4AM | | 0 |
| 5AM | | 0 |
| 6AM | | 0 |
| 7AM | | 0 |
| 8AM | 2 | |
| 9AM | 5 | |
| 10AM | 25 | |
| 11AM | 30 | |
| 12PM | 35 | |
| 1PM | | 0 |
| 2PM | | 0 |
| 3PM | | 0 |
| 4PM | 13 | |
| 5PM | 19 | |
| 6PM | 45 | |
| 7PM | 51 | |
| 8PM | 23 | |
| 9PM | 14 | |
| 10PM | 6 | |
| 11PM | | 0 |
| 12AM | | 0 |

Padding the on-hour intervals that do not have any event occurrence with a zero, enables identification of discontinuous patterns in the time period matrix. Based on the discontinuous patterns, the points in the time matrix that are well separated are determined. With reference to table 2 given above, two discontinuous periods are identified, i.e., 11 PM-7 AM and 1 PM-3 PM. This process of identifying discontinuous periods is repeated for each day, resulting in multiple such discontinuous periods. Thereafter, that one-hour time interval, which has the maximum occurrence across these discontinuous periods, is identified as a time period. This time period is then used to determine a frequent event interval or a seasonal period for events. The derived time period identifies a natural events boundary. In other words, specific points in time between which events start and stop occurring are identified. For example, the 3 AM time slot (T) may be identified as the mode across event data collected for a week. Thus, in this case, events occurring between end of the 3 AM time slot to end of the 2 AM time slot would be grouped. In other words, events occurring between T and T−1 would be grouped. The accurate determination of a time period based on the discontinuous time periods is important, because an inaccurate time period may result in under or over identification of recurrent event patterns.

Thereafter, based on the one or more time periods, network device 102 groups, at 308, the historical events data that includes a plurality of events captured for the IT infrastructure. The historical events data is grouped to create a plurality of data points sets and each data points set is associated with one of the plurality of time periods. The plurality of data points sets provides natural grouping of events leading to contextual time period identification. In an embodiment, when a single time period is derived at 306, that single time period is used to create the plurality of data points sets. Each data points set includes one or more events from the plurality of events. In other words, using the time period, events in the historical events data are divided into distinct data points sets.

In continuation of the example give with reference to table 2 above, 11 PM-7 AM may be derived as the time period, thus defining boundary for start and end of event occurrence in a given day. In this case, each data points set would include events occurring between 7 AM and 11 PM, separated from a subsequent data points set by the discontinuity time period, i.e., 11 PM to 7 AM. If the historical events data has been captured for seven days of a week, then seven such data set points will be created in the current example, where one data points set is created for one day. In an embodiment, events in a data points set may be arranged based on frequency of occurrence of each event in that data points set. In an exemplary embodiment, 'n' Data points Sets (DPS) created may be represented using UID (UID) of events and their frequency of occurrence in a given DPS. This representation is depicted in table 3, where 'n' is the total number of data points sets. It will be apparent to a person skilled in the art that the number of data points sets that are created would depend on the derived time period and distribution of events in the historical events data:

TABLE 3

| DPS1 | | DPS2 ... | | ... DPSn | |
|---|---|---|---|---|---|
| Event UID | F | Event UID | F | Event UID | F |
| 2-13-6-16-4-5-2061-6-2 | 23 | 1-13-6-87-41-22-220-120-2 | 25 | 2-8-6-21-4-8-1038-9-2 | 16 |
| 1-17-3-29-60-11-27-11-7 | 45 | 1-14-6-87-4-22-220-20-2 | 41 | 2-13-6-16-4-5-2061-6-2 | 25 |
| 2-8-6-21-4-8-19-9-2 | 11 | 1-8-6-87-4-22-220-20-2 | 13 | 1-17-3-29-60-11-27-11-7 | 34 |
| 2-61-6-21-4-8-19-9-2 | 10 | 1-8-6-87-4-22-220-20-2 | 11 | 2-11-7-20-14-7-18-8-4 | 13 |
| 2-12-6-21-4-8-19-9-2 | 23 | 1-8-6-87-4-22-220-20-2 | 2 | 2-8-6-21-4-8-493-9-2 | 23 |
| 1-15-1-24-685-9-22-1-5 | 7 | 1-8-6-87-4-22-220-20-2 | 7 | 1-15-1-24-16-9-22-1-5 | 17 |
| 1-15-1-24-772-9-22-1-5 | 1 | 1-8-6-87-4-22-220-20-2 | 10 | 1-15-1-24-15-9-22-1-5 | 12 |
| 1-15-1-24-685-9-22-1-5 | 9 | 2-14-6-21-4-8-504-9-2 | 19 | 1-15-1-24-181-9-22-1-5 | 19 |
| 1-8-6-49-4-16-766-15-2 | 7 | 2-14-6-21-4-8-702-9-2 | 17 | 1-112-1-1334-1133-10-5531-1-5 | 27 |
| 2-8-6-21-4-8-490-9-2 | 8 | 2-14-6-21-4-8-501-9-2 | 28 | 1-5-3-1736-4-2-105-4-2 | 18 |
| 1-8-6-49-4-16-489-15-2 | 29 | 2-14-6-21-4-8-507-9-2 | 9 | 2-49-6-130-4-8-520-9-2 | 9 |
| 1-2-2-1138-4-2-4175-2-2 | 19 | 2-14-6-21-4-8-502-9-2 | 19 | 1-23-2-1686-106-17-6818-16-10 | 9 |
| 2-13-6-21-4-8-19-9-2 | 13 | 2-12-6-130-4-8-520-9-2 | 3 | 2-13-6-16-4-5-2061-6-2 | 3 |
| 2-8-6-21-4-8-490-9-2 | 23 | 2-14-6-21-4-8-506-9-2 | 2 | 2-13-6-16-4-5-2061-6-2 | 23 |
| 1-8-6-49-4-16-489-15-2 | 21 | 1-14-6-87-4-22-220-20-2 | 1 | 2-13-6-16-4-5-2061-6-2 | 24 |

Using the plurality of data points sets, network device 102, at 310, creates an event corpus that includes each of the plurality of events. To create the event corpus, UIDs of events are mined from the plurality of data points sets. In an embodiment, events in the event corpus are arranged based on frequency of occurrence across the plurality of data points sets. At this point of time, frequency of occurrence of an event within a particular data points set is ignored. In other words, in the event corpus, the events are arranged in a such a way, that an event which occurs across maximum number of data points sets is placed at the top and an even that occurs across least number of data points sets is placed at the bottom of the event corpus. An event which only occurs in one data points set may not be included in the event corpus. In an embodiment, only those events that have occurred across at least a predefined percentage of the total number of data points sets are selected for inclusion in the event corpus. The predefined percentage may be defined by a system administrator and may be based on standard requirements. The predefined percentage, for example, may be 25%.

In continuation of the exemplary embodiment give above, the event corpus that is created may be represented by table 4. It will be apparent to a person skilled in the art that only six events are depicted for an illustrative purpose and the event corpus may include every event that has occurred across at least two data points sets.

TABLE 4

| Event UID | Frequency of occurrence across different data points sets |
|---|---|
| 2-13-6-16-4-5-2061-6-2 | 110 |
| 1-17-3-29-60-11-27-11-7 | 110 |
| 1-14-6-87-4-22-220-20-2 | 96 |
| 2-14-6-21-4-8-504-9-2 | 48 |
| 1-15-3-27-42-11-17-20-7 | 48 |
| 2-8-6-21-4-8-490-9-2 | 48 |
| . | . |
| . | . |
| X | . |

In the event corpus depicted by table 4, the events with UID: 2-13-6-16-4-5-2061-6-2 and 1-17-3-29-60-11-27-11-7 have the maximum frequency of occurrence and have each occurred across 110 data points sets, where the total number of data points sets is >110. Further, the event with UID: 1-14-6-87-4-22-220-20-2 has the second highest frequency of occurrence, i.e., 96, and events with unique ID: 2-14-6-21-4-8-504-9-2, 1-15-3-27-42-11-17-20-7, and 2-8-6-21-4-8-490-9-2, each have the same frequency of occurrence, i.e., 48. X is the total number of events in the even corpus.

After the event corpus has been created, network device 102, at 312, identifies one or more events from within the event corpus that have the highest frequency of occurrence. The process of identifying is performed iteratively on the event corpus, such that, in every subsequent iteration the events that were identified in preceding iterations are ignored. In other words, events once identified are not considered in subsequent iterations. By way of an example, referring to table 4, in the first iteration, the events with UID: 2-13-6-16-4-5-2061-6-2 and 1-17-3-29-60-11-27-11-7, having maximum frequency of occurrence, i.e., 110, are identified. In the subsequent iteration, both these events are ignored, and the event with UID: 1-14-6-87-4-22-220-20-2 having the second highest frequency of occurrence, i.e., 96, is identified. Similarly, in the third iteration, the events with UID: 2-14-6-21-4-8-504-9-2, 1-15-3-27-42-11-17-20-7, and 2-8-6-21-4-8-490-9-2, each having a frequency of occurrence of 48, are identified.

In an embodiment, if an event does not have the same frequency of occurrence as at least one other event, that event is not identified at 312. Thus, in this case, at least two events sharing the same frequency of occurrence are identified. This would be the criterion for identifying events and the iteration discussed above would stop, when no two or more events in the event corpus have the same frequency of occurrence. By way of an example of this embodiment, the event with UID: 1-14-6-87-4-22-220-20-2, which was identified in the second iteration of the above example, will be ignored by network device 102 in this case.

Alternatively, iterations of 312 would stop when a predefined percentage of events in the event corpus have been identified. However, in this case, all events that have the same frequency of occurrence would be considered as one event. By way of an example, the predefined percentage is 10% and the total number of events in the event corpus given in the table 4 are 30. Thus, in this case, only the events depicted in table 4 would be selected (three in number) would be selected, considering that events having the same frequency of occurrence are one event.

Thereafter, at 314, the network device determines one or more data points sets in which the one or more events have occurred. In others words, those data points sets are determined, which are common for the one or more events. In an embodiment, the one or more data points sets are determined only when two or more events having the same frequency of occurrence are identified at 312. Moreover, each of these two or more events must have occurred in at least one common data points set. In an embodiment, for an event, the time gap between time periods associated with subsequent data points sets from the one or more data points sets may be same. This time gap, when same, is called a frequent event interval for that event. In case of two or more events that have the same frequency of occurrence and also have common data points sets, then these two or more events would come under the same frequent event interval. The frequent event interval for events may also be termed as seasonal period. As a result of the above analysis, one recurrent event pattern is identified. When this process is carried out iteratively, it will result in multiple such recurrent event patterns.

In continuation of the example given above, the events with UID: 2-13-6-16-4-5-2061-6-2 and 1-17-3-29-60-11-27-11-7 were identified from the event corpus of table 4 as having the maximum frequency of occurrence, i.e., 110. Referring back to data points sets of table 3, considering that the $n^{th}$ data points set is the $3^{rd}$ data points set, the event with UID: 2-13-6-16-4-5-2061-6-2 has occurred in DPS 1 (with a frequency of 23), and DPS3 (with a frequency of 25). Further, the event with UID: 1-17-3-29-60-11-27-11-7, has also occurred in DPS1 (with a frequency of 45) and in DPS3 (with a frequency of 34). Both these events have occurred in DPS1 and DPS 3 and are separated by one data points set. Thus, the frequent event interval for both these events is the timer period associated with DPS2. In other words, each occurrence of these events is separated by time period associated with one data points set.

Once the one or more data points sets have been determined, network device 102, at 316, computes a projected frequency of occurrence of the one or more events identified at 312. The projected frequency is computed for future time periods corresponding to the one or more data points sets. In other words, once the data points sets which are common for the identified events have been determined, projected frequency of occurrence is computed for these identified events for the same time periods, based on which the one or more data points sets were created. The projected frequency of occurrence is computed for same time periods occurring in future.

By way of an example, the event with UID: 2-13-6-16-4-5-2061-6-2 had occurred in each of DPS1 and DPS3, separated by one data points set, i.e., DPS1. Assuming that these data points sets represent grouping of events occurring within a span of three days, DPS1 may include events that occurred between 8 AM and 12 PM on the first day, DPS 2 may include events that occurred between 8 AM and 12 PM on the second day, and DPS3 includes events that occurred between 8 AM and 12 PM on the third day. Thus, projected frequency of occurrence of the event with UID: 2-13-6-16-4-5-2061-6-2, will be computed for these time periods, i.e., 8 AM-12 PM on the first day and 8 AM-12 PM on the second day.

To project frequency of occurrence of the one or more events for future time periods associated with the one or more data points sets, network device 102 first determines the frequency of occurrence of the one or more events in each of the one or more data points sets. In continuation of the example above, for the event with UID: 2-13-6-16-4-5-2061-6-2, frequency of occurrence is determined for each of DPS1 (23), and DPS3 (25). These are then used to project the frequency of occurrence of the event with UID: 2-13-6-16-4-5-2061-6-2 for future time periods. This is further explained in detail in conjunction with FIG. 5.

Figure 4:
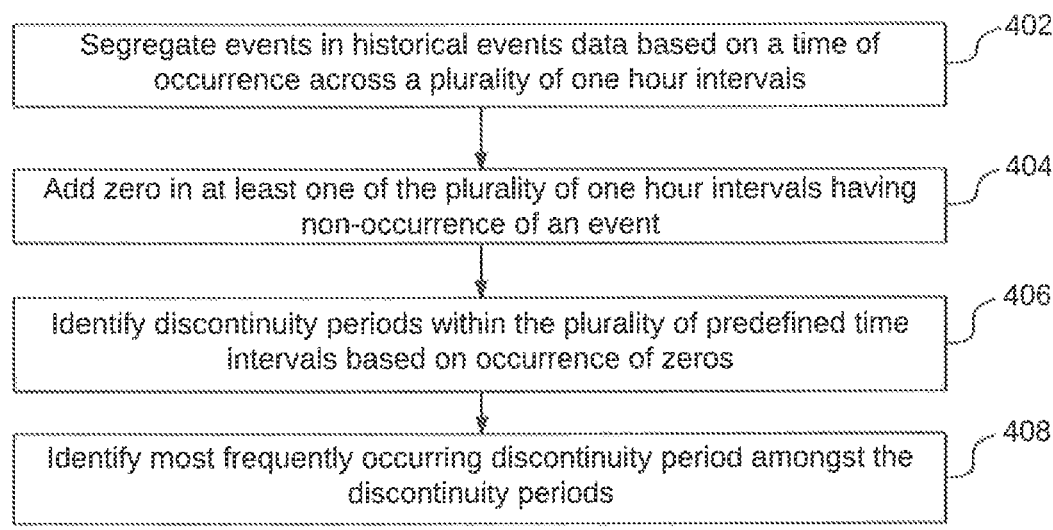
FIG. 4 illustrates a flowchart of a method for derive at least one time period based on historical events data of the IT infrastructure, in accordance with an embodiment.

Referring now to FIG. 4, a flowchart of a method for derive one or more time periods based on historical events data of the IT infrastructure is illustrated, in accordance with an embodiment. Referring back to 306 in FIG. 3, to derive the one or more time periods based on the historical events data, at 402, events in the historical events data are segregated based on a time of occurrence across a plurality of one-hour intervals. Thereafter, at 404, zeros are added to one or more of the plurality of one hour intervals where there is no occurrence of any event. Based on the occurrence of zeros, discontinuity periods within the plurality of predefined time intervals are then identified at 406. Thereafter, the most frequently occurring discontinuity period amongst the discontinuity periods is identified at 408. This has already been explained in detail in conjunction with FIG. 3.

Figure 5:
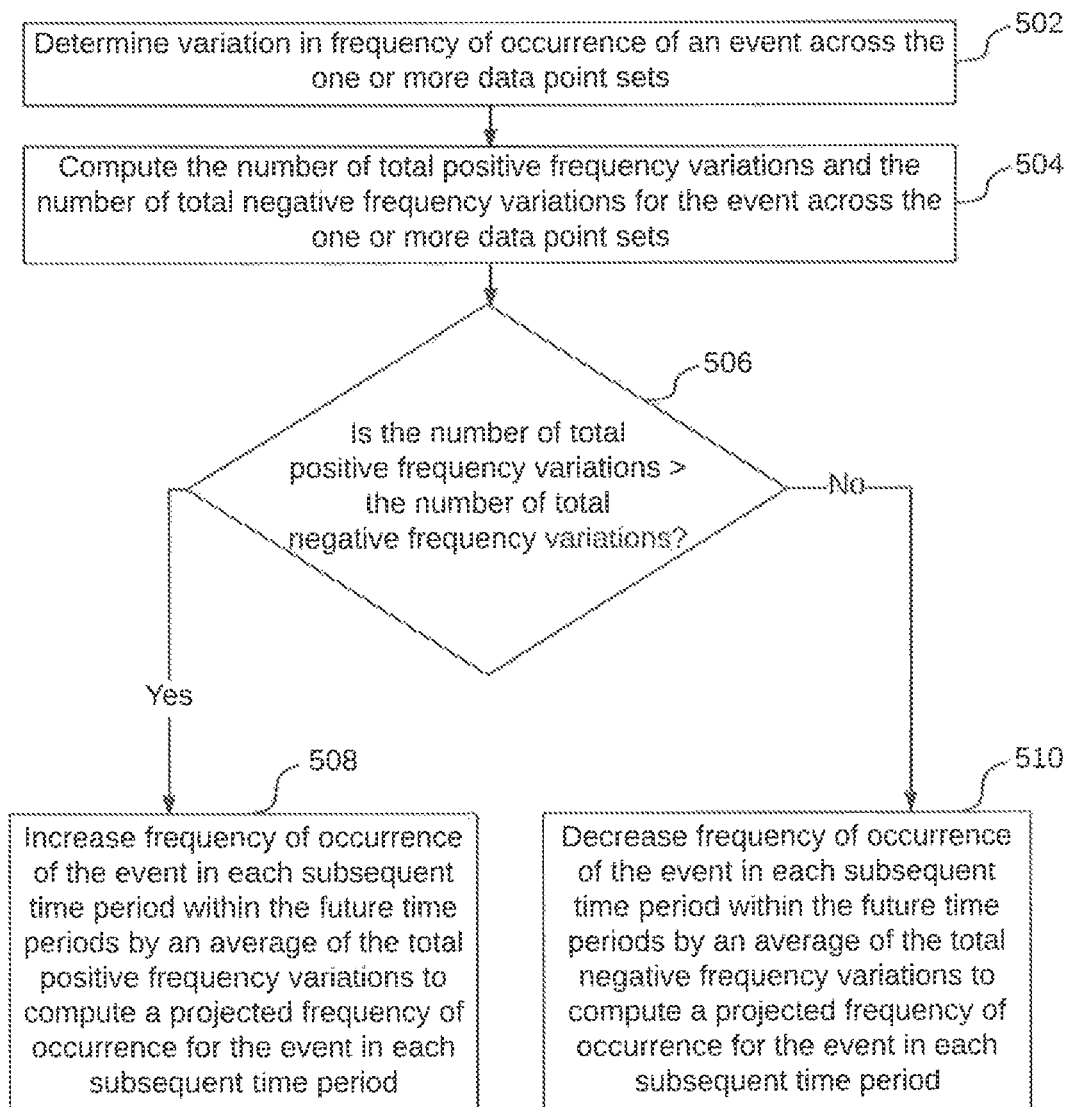
FIG. 5 illustrates a flowchart of a method for computing a projected frequency of occurrence of one or more events in future time periods, in accordance with an embodiment.

Referring now to FIG. 5, a flowchart of a method for computing a projected frequency of occurrence of one or more events in future time periods is illustrated, in accordance with an embodiment. In order to compute a projected frequency of occurence, once the one or more data points sets for the one or more events have been determined, the variation in frequency of occurrence of an event across the one or more data points sets is determined at 502. By way of an example, the frequency of occurrence of the event with UID: 2-13-6-16-4-5-2061-6-2 across the data points sets separated by frequent event interval is represented by table 5 given below:

TABLE 5

| Data points Set | Frequency of occurrence of the event | Frequency Variation |
|---|---|---|
| DPS1 | 23 | |
| DPS3 | 25 | +2 (25 − 23) |
| DPS5 | 5 | −20 (5 − 25) |
| DPS7 | 17 | +12 (17 − 5) |

TABLE 5-continued

| Data points Set | Frequency of occurrence of the event | Frequency Variation |
|---|---|---|
| DPS9 | 54 | +37 (54 − 17) |
| DPS11 | 5 | −49 (5 − 54) |
| DPS13 | 2 | −3 (2 − 5) |
| DPS15 | 36 | +34 (36 − 2) |

By way of an example, with reference to table 3, the event with UID: 2-13-6-16-4-5-2061-6-2 has a frequency of occurrence of 23 in DPS1 and 25 in DPS3. Based on the frequent event interval for this event, the other data points sets for this event include: DPS5, DPS7, DPS9, DPS11, DPS 13, and DPS15. The frequency of occurrence for each of these data points sets is given in table 5 above. Using these frequency of occurrences in each of the data points sets, the variation in frequency of occurrence of this event across consecutive data points sets given in table 5 are determined. Variation in frequency of occurrence for this event is represented as: +2, −20, +12, +37, −49, −3, and +34. Thus, there are seven frequency variations in all.

At 504, the number of total positive frequency variations and the number of total negative frequency variations for the event across the one or more data points sets is computed. In continuation of the example above, the number of total positive variations is four (+2, +12, +37, and +34), while the number of total negative variations is three (−20, −49, and −3). To make sure that either of the positive or negative number of frequency variations is dominant, even number of data points sets are considered to determine frequency variations. The even number of data points sets would result in an odd number of frequency variations.

Thereafter, at 506, a check is performed to determine whether the total number of positive frequency variations is greater than the total number of negative frequency variations. If the positive frequency variations are greater than the negative frequency variations, frequency of occurrence of the event in each subsequent time period within the future time periods is increased by an average of the total positive frequency variations at 508. This would result in a projected frequency of occurrence for the event in each subsequent time period.

In continuation of the example above, as the total number of positive frequency variations (four) is greater than the total number of negative variations (three), an average of all positive frequency variations is determined as 21: [(2+12+37+34)/4]. Now, to compute the projected frequency of occurrence for the event in a subsequent future time period (associated with DPS17), the frequency of occurrence in DPS15 (36) is increase by 21, resulting in 57 as the frequency of occurrence. To compute the projected frequency of occurrence for another subsequent future time period, the above process will be repeated again.

Referring back to 506, if the negative frequency variations are greater than the positive frequency variations, frequency of occurrence of the event in each subsequent time period within the future time periods is decreased by an average of the total negative frequency variations. This results in a projected frequency of occurrence for the event in each subsequent time period. In continuation of the example above, for illustrative purpose, let us consider the positive variations as negative variation and the negative variation as positive variations. Thus, variations in frequency of occurrence of the event will be represented as: −2, +20, −12, −37, +49, +3, and −34. Thus, the number of negative variations would be more than the positive variations. An average of all negative frequency variations is determined as −21: [(−2−12−37−34)/4]. Thus, to compute the projected frequency of occurrence for the event in a subsequent future time period (associated with DPS 17), the frequency of occurrence in DPS15 (36) is decreased by 21, resulting in 15 as the frequency of occurrence.

Figure 6:
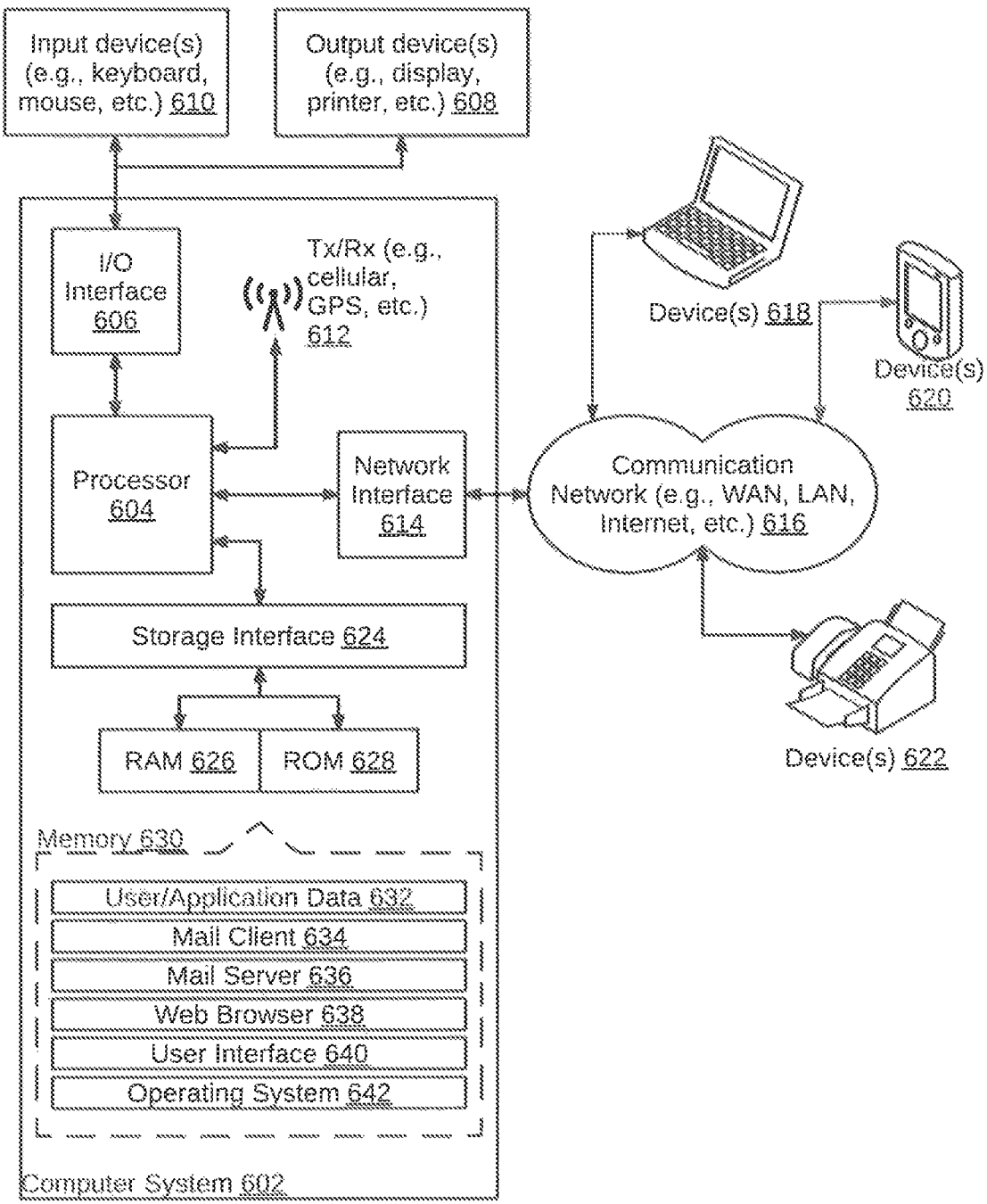
FIG. 6 illustrates a block diagram of an exemplary computer system for implementing various embodiments.

Referring now to FIG. 6, a block diagram of an exemplary computer system 602 for implementing various embodiments is illustrated. Computer system 602 may comprise a central processing unit ("CPU" or "processor") 604. Processor 604 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 610 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 608 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 604 may be disposed in communication with a communication network 616 via a network interface 614. Network interface 614 may communicate with communication network 616. Network interface 614 may employ connection protocols including, without limitation, direct connect, Ethernet (e.g., twisted pair 10/100/1000 Base T), transmission control protocoll/internet protocol (TCP/IP), token ring, IEEE 802.11a/b/g/n/x, etc. Communication network 616 may include, without limitation, a direct interconnection, local area network (LAN), wide area network (WAN), wireless network (e.g., using Wireless Application Protocol), the Internet, etc. Using network interface 614 and communication network 616, computer system 602 may communicate with devices 618, 620, and 622. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624. Storage interface 624 may connect to memory devices 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 630 may store a collection of program or database components, including, without limitation, an operating system 642, a user interface 640, a web browser 638, a mail server 636, a mail client 634, a userlapplication data 632 (e.g., any data variables or data records discussed in this disclosure), etc. Operating system 642 may facilitate resource management and operation of the computer system 602. Examples of operating system 642 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista7/8, etc.), Apple iOS, Google Android, Blackberry OS, or the like. User interface 640 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 602 may implement web browser 638 stored program component. Web browser 638 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 602 may implement mail server 636 stored program component. Mail server 636 may be an Internet mail server such as Microsoft Exchange, or the like. The mail server may utilize facilities such as ASP, ActiveX, ANSI C++/C #, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement mail client 634 stored program component. Mail client 634 may be a mail viewing application, such as Apple Mail, Microsoft Entourage, Microsoft Outlook, Mozilla Thunderbird, etc.

In some embodiments, computer system 602 may store user/application data 632, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide methods and systems for identifying and projecting recurrent event patterns in IT infrastructure. These methods and system enable identification of recurrent event pattern based seasonal patterns that leads to improved projection of event occurrence. This further helps in avoiding the no-action calls in IT service, exploring the unwanted occurrence and further suppressing them.

The specification has described methods and systems for identifying and projecting recurrent event patterns in IT infrastructure. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alterative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for identifying and projecting recurrent event patterns in an Information Technology (IT) infrastructure, the method comprising:
   deriving, by a network device, at least one time period based on historical events data of the IT infrastructure, wherein deriving the at least one time period comprises identifying at least one frequent event interval upon identifying discontinuity periods in the historical events data;
   grouping, by the network device, the historical events data comprising a plurality of events captured for the IT infrastructure, based on the at least one time period to create a plurality of data points sets, wherein each data points set is associated with one of the at least one time period and comprises at least one event from the plurality of events;
   creating, by the network device, an event corpus comprising each of the plurality of events arranged based on frequency of occurrence across the plurality of data points sets;
   identifying, by the network device, one or more events that have highest frequency of occurrence within the event corpus, wherein the identifying is iteratively performed on the event corpus, each subsequent iteration of the identifying ignores events identified in preceding iterations of the identifying;
   determining, by the network device, one or more data points sets from the plurality of data points sets in which the one or more events have occurred; and
   computing, by the network device, a projected frequency of occurrence of the one or more events in future time periods corresponding to the one or more data points sets based on variation in frequency of occurrence of the one or more events in the one or more data points sets.

2. The method of claim 1 further comprising:
   retrieving the historical events data associated with the IT infrastructure; and
   storing the historical events data in a predefined representation.

3. The method of claim 1, wherein deriving a time period of the at least one time period comprises:
   segregating events in the historical events data based on a time of occurrence across a plurality of one-hour intervals; and
   adding zero in at least one of the plurality of one hour intervals having non-occurrence of an event.

4. The method of claim 3 further comprising identifying discontinuity periods within the plurality of one-hour intervals based on occurrence of zeros.

5. The method of claim 4 further comprising identifying most frequently occurring discontinuity period amongst the discontinuity periods.

6. The method of claim 1, wherein events in a data points set from the plurality of data points sets are arranged based on frequency of occurrence of each event in the data points set.

7. The method of claim 1, wherein determining the one or more data points sets comprises identifying a set of events from the one or more events that occur in same data points sets from the plurality of data points sets, the one or more data points sets are determined for the set of events.

8. The method of claim 1, wherein computing the projected frequency of occurrence of an event from the one or more events comprises determining variation in frequency of occurrence of the event across the one or more data points sets.

9. The method of claim 8 further comprising, comparing the total number of positive frequency variations and the total number of negative frequency variations for the event across the one or more data points sets.

10. The method of claim 9 further comprising increasing frequency of occurrence of the event in each subsequent time period within the future time periods by an average of the total positive frequency variations to compute a projected frequency of occurrence for the event in each subsequent time period, when the number of total positive frequency variations is greater than the number of total negative frequency variations.

11. The method of claim 9 further comprising decreasing frequency of occurrence of the event in each subsequent time period within the future time periods by an average of the total negative frequency variations to compute a projected frequency of occurrence for the event in each subsequent time period, when the number of total negative frequency variations is greater than the number of total positive frequency variations.

12. A network device for identifying and projecting recurrent event patterns in an Information Technology (IT) infrastructure, the network device comprising:
   at least one processor; and
   a memory communicatively coupled to the processor, wherein the memory stores processor instructions, which, on execution, causes the processor to:
      derive at least one time period based on historical events data of the IT infrastructure, wherein to derive the at least one time period, the processor instructions, on execution, further causes the processor to identify at least one frequent event interval upon identifying discontinuity periods in the historical events data;
      group the historical events data comprising a plurality of events captured for the IT infrastructure, based on the at least one time period to create a plurality of data points sets, wherein each data points set is associated with one of the at least one time period and comprises at least one event from the plurality of events;

create an event corpus comprising each of the plurality of events arranged based on frequency of occurrence across the plurality of data points sets;

identify one or more events that have highest frequency of occurrence within the event corpus, wherein the processor instructions, on execution, further causes the processor to identify the one or more events within the event corpus iteratively, wherein each subsequent iteration of the identifying ignores events identified in preceding iterations of the identifying;

determine one or more data points sets from the plurality of data points sets in which the one or more events have occurred; and compute a projected frequency of occurrence of the one or more events in future time periods corresponding to the one or more data points sets based on variation in frequency of occurrence of the one or more events in the one or more data points sets.

13. The network device of claim 12, wherein the processor instructions, on execution, further causes the processor to:

retrieve the historical events data associated with the IT infrastructure; and store the historical events data in a predefined representation.

14. The network device of claim 12, wherein to derive a time period of the at least one time period, the processor instructions, on execution, further causes the processor to:

segregating events in the historical events data based on a time of occurrence across a plurality of one-hour intervals; and adding zero in at least one of the plurality of one hour intervals having non-occurrence of an event.

15. The network device of claim 14, wherein the processor instructions, on execution, further causes the processor to identify discontinuity periods within the plurality of one-hour intervals based on occurrence of zeros.

16. The network device of claim 15, wherein the processor instructions, on execution, further causes the processor to identify most frequently occurring discontinuity period amongst the discontinuity periods.

17. The network device of claim 12, wherein to compute the projected frequency of occurrence of an event from the one or more events, the processor instructions, on execution, further causes the processor to determine variation in frequency of occurrence of the event across the one or more data points sets.

18. The network device of claim 17, wherein the processor instructions, on execution, further causes the processor to compare the total number of positive frequency variations and the total number of negative frequency variations for the event across the one or more data points sets.

19. A non-transitory computer-readable storage medium having stored thereon, a set of computer-executable instructions for identifying and projecting recurrent event patterns in an Information Technology (IT) infrastructure, causing a computer comprising one or more processors to perform steps comprising:

deriving, by a network device, at least one time period based on historical events data of the IT infrastructure, wherein deriving the at least one time period comprises identifying at least one frequent event interval upon identifying discontinuity periods in the historical events data;

grouping, by the network device, the historical events data comprising a plurality of events captured for the IT infrastructure, based on the at least one time period to create a plurality of data points sets, wherein each data points set is associated with one of the plurality of time periods and comprises at least one event from the plurality of events;

creating, by the network device, an event corpus comprising each of the plurality of events arranged based on frequency of occurrence across the plurality of data points sets;

identifying, by the network device, one or more events that have highest frequency of occurrence within the event corpus, wherein the identifying is iteratively performed on the event corpus, each subsequent iteration of the identifying ignores events identified in preceding iterations of the identifying;

determining, by the network device, one or more data points sets from the plurality of data points sets in which the one or more events have occurred; and computing, by the network device, a projected frequency of occurrence of the one or more events in future time periods corresponding to the one or more data points sets based on variation in frequency of occurrence of the one or more events in the one or more data points sets.

* * * * *